US008614690B2

(12) United States Patent
Grunthaner et al.

(10) Patent No.: US 8,614,690 B2
(45) Date of Patent: Dec. 24, 2013

(54) TOUCH SENSOR PANEL USING DUMMY GROUND CONDUCTORS

(75) Inventors: Martin Paul Grunthaner, San Francisco, CA (US); Steve Porter Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 777 days.

(21) Appl. No.: 12/239,622

(22) Filed: Sep. 26, 2008

(65) Prior Publication Data

US 2010/0079402 A1 Apr. 1, 2010

(51) Int. Cl.
*G06F 3/045* (2006.01)
*G06F 3/041* (2006.01)
*G06F 3/044* (2006.01)
*G08C 21/00* (2006.01)
*G01R 27/26* (2006.01)

(52) U.S. Cl.
USPC ........ 345/174; 345/173; 178/18.06; 324/658; 324/679; 324/688

(58) Field of Classification Search
USPC .................. 345/173–178; 178/18.01–20.04; 324/658–690
See application file for complete search history.

(56) References Cited

U.S. PATENT DOCUMENTS

| | | |
|---|---|---|
| 4,859,814 A | 8/1989 | Sciacero et al. |
| 5,483,261 A | 1/1996 | Yasutake |
| 5,488,204 A | 1/1996 | Mead et al. |
| 5,495,077 A | 2/1996 | Miller et al. |
| 5,818,672 A | 10/1998 | Hilbe |
| 5,825,352 A | 10/1998 | Bisset et al. |
| 5,835,079 A | 11/1998 | Shieh |
| 5,880,411 A | 3/1999 | Gillespie et al. |
| 5,914,465 A | 6/1999 | Allen et al. |
| 5,923,320 A | 7/1999 | Murakami et al. |
| 6,188,391 B1 | 2/2001 | Seely et al. |
| 6,310,610 B1 | 10/2001 | Beaton et al. |
| 6,310,611 B1 | 10/2001 | Caldwell |
| 6,323,846 B1 | 11/2001 | Westerman et al. |

(Continued)

FOREIGN PATENT DOCUMENTS

| | | |
|---|---|---|
| EP | 0 684 580 A2 | 11/1995 |
| EP | 0 684 580 A3 | 11/1995 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Bipin Shalwala
*Assistant Examiner* — Ryan A Lubit
(74) *Attorney, Agent, or Firm* — Morrison & Foerster LLP

(57) ABSTRACT

Methods and apparatus for correcting electrical noise coupling from a liquid crystal module to a plurality of sense elements disposed within a touch sensor panel, and for reducing errors in touch detection algorithms. Erroneous signal values detected by the sense elements may be corrected by utilizing a set of reference elements for detecting noise common to both the sense elements and the reference elements, and a correction module for effectively subtracting out the noise from the sensed values. Errors in touch detection algorithms may be reduced by providing a more uniform spacing between successive sense elements. In some embodiments, one or more dummy ground elements may be inserted between adjacent sense elements in order to reduce signal interference.

23 Claims, 12 Drawing Sheets

(56) References Cited

U.S. PATENT DOCUMENTS

| | | | |
|---|---|---|---|
| 6,452,514 B1* | 9/2002 | Philipp | 341/33 |
| 6,570,441 B1* | 5/2003 | Sasaki | 329/306 |
| 6,690,387 B2 | 2/2004 | Zimmerman et al. | |
| 7,015,894 B2 | 3/2006 | Morohoshi | |
| 7,057,909 B2 | 6/2006 | Fujisaki et al. | |
| 7,109,978 B2 | 9/2006 | Gillespie et al. | |
| 7,129,714 B2 | 10/2006 | Baxter | |
| 7,184,064 B2 | 2/2007 | Zimmerman et al. | |
| 7,298,803 B2 | 11/2007 | Alexander | |
| 7,663,607 B2 | 2/2010 | Hotelling et al. | |
| 2001/0015711 A1* | 8/2001 | Aoki | 345/92 |
| 2001/0040545 A1* | 11/2001 | Mishima et al. | 345/87 |
| 2003/0127984 A1* | 7/2003 | Kim et al. | 313/586 |
| 2003/0177349 A1* | 9/2003 | Hersh | 713/155 |
| 2004/0095333 A1 | 5/2004 | Morag et al. | |
| 2004/0189617 A1* | 9/2004 | Gerpheide et al. | 345/174 |
| 2005/0122119 A1 | 6/2005 | Barlow | |
| 2005/0189154 A1 | 9/2005 | Perski et al. | |
| 2005/0253598 A1 | 11/2005 | Kawahata | |
| 2005/0271326 A1 | 12/2005 | Luo | |
| 2006/0007171 A1 | 1/2006 | Burdie et al. | |
| 2006/0017710 A1 | 1/2006 | Lee et al. | |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2006/0284639 A1* | 12/2006 | Reynolds | 324/765 |
| 2007/0258172 A1 | 11/2007 | Thein et al. | |
| 2007/0268272 A1 | 11/2007 | Perski et al. | |
| 2008/0006453 A1 | 1/2008 | Hotelling | |
| 2008/0157893 A1 | 7/2008 | Krah | |
| 2008/0158182 A1 | 7/2008 | Westerman | |
| 2008/0164076 A1 | 7/2008 | Orsley | |
| 2008/0278178 A1 | 11/2008 | Philipp | |
| 2009/0085894 A1 | 4/2009 | Gandhi et al. | |
| 2009/0127003 A1 | 5/2009 | Geaghan | |
| 2010/0079401 A1 | 4/2010 | Staton | |
| 2010/0301879 A1* | 12/2010 | Philipp | 324/679 |

FOREIGN PATENT DOCUMENTS

| | | |
|---|---|---|
| EP | 0 706 147 A2 | 4/1996 |
| EP | 0 706 147 A3 | 4/1996 |
| EP | 0 706 147 B1 | 4/1996 |
| EP | 1 496 467 A2 | 1/2005 |
| EP | 1 496 467 A3 | 1/2005 |
| JP | 2000-163031 A | 6/2000 |
| JP | 2002-342033 A | 11/2002 |
| WO | WO-2005/114369 A2 | 12/2005 |
| WO | WO-2005/114369 A3 | 12/2005 |
| WO | WO-2009/027629 A1 | 3/2009 |
| WO | WO-2010/036649 A2 | 4/2010 |
| WO | WO-2010/036649 A3 | 4/2010 |
| WO | WO-2010/036651 A2 | 4/2010 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report mailed May 3, 2011, for PCT Application No. PCT/US2009/057853, filed Sep. 22, 2009, six pages.

International Search Report mailed Feb. 23, 2011, for PCT Application No. PCT/US2009/057850, filed Sep. 22, 2009, four pages.

Non-Final Office Action mailed Aug. 17, 2011, for U.S. Appl. No. 12/239,594, filed Sep. 26, 2008, 35 pages.

Final Office Action mailed Apr. 5, 2012, for U.S. Appl. No. 12/239,594, filed Sep. 26, 2008, 57 pages.

* cited by examiner

TOUCH SENSOR PANEL USING DUMMY GROUND CONDUCTORS

FIELD OF THE INVENTION

The present invention relates generally to the field of touch detection. More particularly, the present invention is directed in one exemplary aspect to methods and apparatus for improved touch detection in touch input devices.

BACKGROUND OF THE INVENTION

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Single-sided mutual capacitance touch sensor panels typically include a plurality of sense elements distributed across a substrate. Each sense element is separated from an associated set of drive elements by a distance sufficient to enable the sense element to detect when a stimulating voltage has been applied to a particular drive element. When a finger, stylus, or other conductive element is situated proximate to a particular region of the touch sensor panel, a portion of the charge driven by the stimulating voltage escapes via the conductive pathway formed by the finger, stylus, or other conductive element. The amount of charge coupling detected by the sense element is therefore reduced relative to the amount of charge coupling that would be detected absent the conductive pathway. A touch region can then be calculated based upon determining which sense elements have transmitted reduced signals for a particular sensed period.

In some touch sensor panels, the touch surface is situated in front of a liquid crystal display module (LCM). The LCM generates electromagnetic noise which can adversely affect operation of the touch sensor panel. In order to protect the touch sensor panel from the noise generated by the LCM, several techniques have been utilized. In some devices, for example, a conductive shield is deposited upon the back side of the touch sensor panel. The conductive shield adequately filters out noise generated by the LCM, but it also increases the costs of manufacturing the touch sensor panel because deposition and/or patterning of conductive elements is required for both sides of the touch panel substrate. In other devices, a set of reference elements is added to the touch panel layout such that each sense element includes a proportionally sized reference element. The reference elements are spaced far enough from the drive elements so that the capacitive coupling between the reference elements and the drive elements is small or negligible. Signals detected by the reference elements are subtracted from signals detected from associated sense elements in order to filter out the noise common to both elements. This approach, however, consumes a substantial amount of space on the touch sensor panel and can result in undesirably large pixel sizes or smaller sense elements yielding decreased performance.

Additionally, some touch sensor panels are arranged such that successive sense elements are non-uniformly spaced. This often occurs in layouts where the sense elements are distributed in an asymmetric manner among the drive elements, or where common routing must traverse a portion of the touch sensor panel in order to reach its destination. The non-uniform spacing between sense elements introduces errors in algorithms adapted to determine a touch region from a set of reported sense signals, since these algorithms often assume that the sense elements are evenly spaced across the entire touch surface. In some cases, the non-uniform spacing between sense elements can even create regions of the touch sensor panel that are unresponsive to touch input (i.e., "dead zones").

SUMMARY OF THE INVENTION

Some touch sensor panels are fabricated as a set of conductive traces patterned upon one side of a transparent substrate. The conductive traces are usually arranged such that the touch sensor panel comprises a grid-like structure of touch pixels formed from a plurality of drive and sense elements, where the touched region can be determined by detecting changes in charge coupling between the drive elements and the sense elements of touch pixels situated proximate to the touched region. In some embodiments, the touch sensor panel can be disposed in front of an LCM adapted to transmit light through the transparent substrate.

Unfortunately, electrical noise coupling from the LCM to the touch sensor electrodes can adversely affect the touch detection mechanism of the touch sensor panel, causing sense elements to report erroneous signal values. Some embodiments of the present invention therefore correct the erroneous signal values by utilizing a set of reference elements for detecting noise common to both the sense elements and the reference elements, and a correction module for effectively subtracting out the noise from the sensed values. In some embodiments, physical space on the touch sensor panel is preserved by utilizing reference elements that are a fraction of the size of the sense elements. In some embodiments, physical space on the touch sensor panel is preserved by utilizing less reference elements than sense elements.

Many touch sensor panels also include sense elements that are non-evenly spaced. This non-uniformity introduces error in algorithms adapted to calculate a center of contact based upon the reported touch locations from the touch pixels. Some embodiments of the present invention therefore reduce the errors in touch detection algorithms by providing a more uniform spacing between successive sense elements. In some embodiments, one or more dummy ground elements are inserted between adjacent sense elements in order to reduce signal interference.

DETAILED DESCRIPTION OF THE PREFERRED EMBODIMENTS

Figure 1:
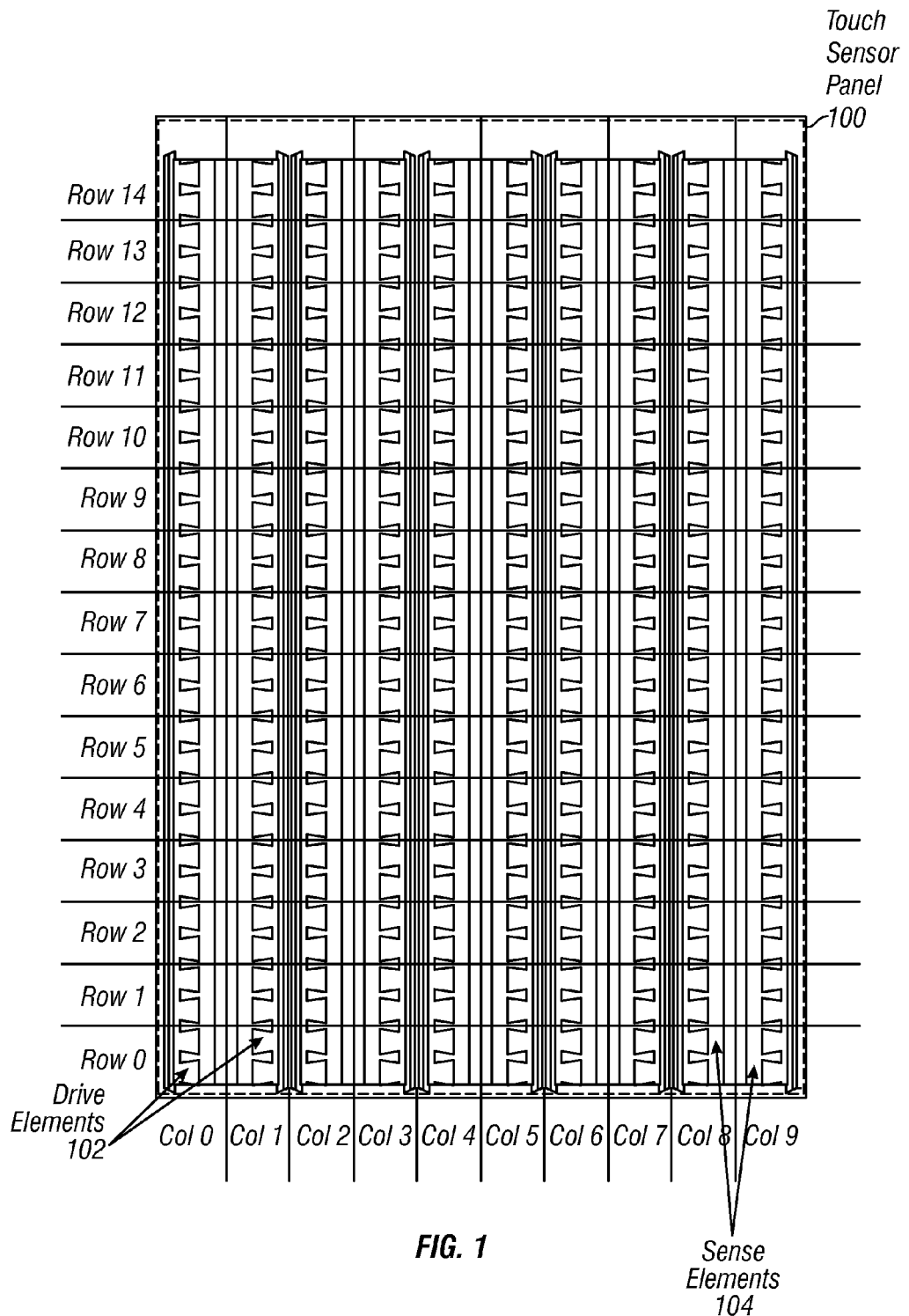
FIG. 1 illustrates a touch sensor panel having a set of sense elements arranged in an asymmetric manner among a set of drive elements.

In the following description of preferred embodiments, reference is made to the accompanying drawings in which it is shown by way of illustration specific embodiments in which the invention can be practiced. It is to be understood that other embodiments can be used and structural changes can be made without departing from the scope of the embodiments of this invention.

As used herein, the terms "computer program" and "software" include without limitation any sequence of human or machine cognizable steps that are adapted to be processed by a computer. Such may be rendered in any programming language or environment including, for example, C/C++, Fortran, COBOL, PASCAL, Perl, Prolog, Python, MATLAB, assembly language, scripting languages, markup languages (e.g., HTML, SGML, XML, VoXML), functional languages (e.g., APL, Erlang, Haskell, Lisp, ML, F# and Scheme), as well as object-oriented environments such as the Common Object Request Broker Architecture (CORBA), Java™ (including J2ME, Java Beans, etc.).

As used herein, the term "display" includes any type of device adapted to display information, including without limitation cathode ray tube displays (CRTs), liquid crystal displays (LCDs), thin film transistor displays (TFTs), digital light processor displays (DLPs), plasma displays, light emitting diodes (LEDs) or diode arrays, incandescent devices, and fluorescent devices. Display devices also include less dynamic devices such as printers, e-ink devices, and other similar structures.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the term "module" refers to any type of software, firmware, hardware, or combination thereof that is designed to perform a desired function.

As used herein, the term "network" refers generally to any type of telecommunications or data network including, without limitation, cable networks, satellite networks, optical networks, cellular networks, and bus networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, hybrid fiber coaxial, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, TCP/IP, H.323, etc.).

As used herein, the terms "processor," "microprocessor," and "digital processor" include all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, and application-specific integrated circuits (ASICs). Such processors may be contained on a single unitary IC die or distributed across multiple components.

Some touch sensor panels are fabricated as a set of conductive traces patterned upon one side of a transparent substrate. The conductive traces are usually arranged such that the touch sensor panel comprises a grid-like structure of touch pixels formed from a plurality of drive and sense elements, where the touched region can be determined by detecting changes in charge coupling between the drive elements and the sense elements of touch pixels situated proximate to the touched region. In some embodiments, the touch sensor panel can be disposed in front of an LCM adapted to transmit light through the transparent substrate.

Unfortunately, electrical noise coupling from the LCM to the touch sensor electrodes can adversely affect the touch detection mechanism of the touch sensor panel, causing sense elements to report erroneous signal values. Some embodiments of the present invention therefore correct the erroneous signal values by utilizing a set of reference elements for detecting noise common to both the sense elements and the reference elements, and a correction module for effectively subtracting out the noise from the sensed values. In some embodiments, physical space on the touch sensor panel is preserved by utilizing reference elements that are a fraction of the size of the sense elements. In some embodiments, physical space on the touch sensor panel is preserved by utilizing less reference elements than sense elements.

Many touch sensor panels also include sense elements that are non-evenly spaced. This non-uniformity introduces error in algorithms adapted to calculate a center of contact based upon the reported touch locations from the touch pixels. Some embodiments of the present invention therefore reduce the errors in touch detection algorithms by providing a more uniform spacing between successive sense elements. In some embodiments, one or more dummy ground elements are inserted between adjacent sense elements in order to reduce signal interference.

Although embodiments of the invention may be described and illustrated herein in terms of single-sided touch sensor panels, it should be understood that embodiments of this invention are not so limited, but are additionally applicable to double-sided panels as well as configurations in which the drive and sense elements are formed on different substrates or on the back side of a cover glass. Additionally, although embodiments of the present invention may be described and illustrated herein in terms of touch sensor panels disposed in front of liquid crystal display modules (LCMs), it should be understood that the present invention is not limited to LCMs, but may include other types of display technologies as well as other sources of electromagnetic interference. Furthermore, although embodiments of the present invention may be described and illustrated herein in terms of conductive elements patterned from indium-tin oxide (ITO) material, the present invention is not limited to conductive elements formed from ITO, but may be formed from various other types of conductive material. This includes, without limitation, amorphous silicon, copper indium diselenide, cadmium telluride and film crystalline silicon.

Mutual capacitance touch sensor panels typically include a plurality of conductive elements adapted to service each region of a touch surface. The touch sensor panel can be conceived as a two-dimensional array of touch pixels, where each pixel can indicate a unique region of touch. In many touch sensor panels, such as the one depicted in FIG. 1, each pixel of the touch sensor panel 100 is defined by a unique row and column combination. For example, the touch sensor panel 100 shown in FIG. 1 includes fifteen rows and ten columns, thus presenting one-hundred and fifty unique touch pixels.

In many touch sensor panels, each touch pixel is serviced by a drive element and a sense element. In FIG. 1, for example, there are a total of ten sense elements 104, where each sense element 104 runs continuously and vertically across the length of the touch panel 100. The drive elements 102, by contrast, may be individual but connected segments, where each segment is specific to a particular touch pixel. For example, in FIG. 1, there are shown one-hundred and fifty different drive elements 102, that is to say, fifteen drive elements 102 per each sense element 104.

The sense elements 104 are positioned close enough (i.e., are in sufficiently close proximity) to capacitively couple to a set of nearby drive elements 102. In some embodiments, the drive elements can be stimulated in any predetermined sequence, such as starting with the drive elements situated at Row 0, then at Row 1, Row 2, etc. sequentially until Row 14, and then repeating at Row 0 in a continuous fashion. Output from a sense element 104 may thus be analyzed over a time period that has been segmented into temporal blocks, where each temporal block corresponds to the time at which a particular drive element 102 has been stimulated. In the touch sensor panel 100 depicted in FIG. 1, this enables the touch detection logic to distinguish between touches located at different rows along the same column. In other embodiments, multiple rows of drive elements can be stimulated at the same time, with the resulting touch data post-processed to determine the locations of touch.

When a stimulating voltage is applied to a drive element 102, the stimulating voltage causes an amount of charge to capacitively couple onto a nearby sense element 104. The sense element 104, in turn, generates a signal that is a function of the applied voltage. However, when a finger, stylus, or other conductive mechanism is positioned proximate to a stimulated drive element 102 and a capacitively coupled sense element 104, a new conductive pathway is formed between the drive element 102 and the conductive mechanism. Thus, a portion of the charge which would otherwise be coupled onto the sense element 104 is instead directed through the finger, stylus, or other conductive mechanism (for example, to Earth ground). The reduced signal reported by the sense element 104 due to the reduced charge coupling serves to indicate that a particular pixel has been touched.

In many cases, the finger, stylus, or other conductive mechanism will also attract a small amount of charge from the stimulated drive elements 102 of nearby pixels (i.e., pixels that are not directly underneath the touched region). The sense elements 104 servicing these pixels will also report a reduced signal, but the amount of signal reduction will be smaller since a greater distance separates these pixels from the finger, stylus, or other conductive mechanism.

By analyzing the signal profiles of all pixels of the touch sensor panel, a center of contact can be calculated indicating the approximate location of the touch on the touch sensor panel. This center of contact is frequently referred to as a centroid. For instance, if a signal analysis indicated equally reduced signals at row 0, column 1 and row 0, column 2, this might indicate that the finger, stylus, or other conductive mechanism is centered on the border of pixels (0,1) and (0,2). Conversely, if the signal analysis indicated a stronger signal reduction in row 0, column 1 than at row 0, column 2, this might indicate that the finger is squarely centered over pixel (0,1). Note that in some applications, multiple centroids may be calculated, thus indicating multiple touches on the touch sensor panel.

In some touch input devices, the touch surface is situated in front of a liquid crystal display module (LCM). During normal operation, the LCM generates electrical noise that is common to various components of the touch sensor panel, and is therefore referred to as "common mode noise." The common mode noise capacitively couples to the sense elements of the panel, thereby creating distortions in the sensed signals. Since the sense elements 104 cannot differentiate between changes in charge coupling from a stimulated drive element 102 and common mode noise generated from the LCM, the noise will often introduce error into centroid calculation.

An exemplary solution to the common mode noise problem discussed above is to distribute one or more reference elements across the touch sensor panel 100, where any one of the reference elements can be combined electrically into one or more larger elements, or individually processed in the analog or digital domain and scaled as needed for effective subtraction of the common mode noise from the sense elements.

Figure 2A:
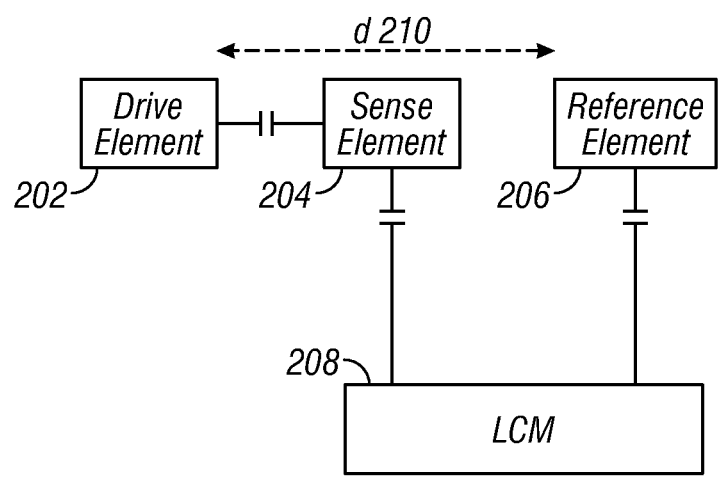
FIG. 2A illustrates an exemplary configuration for correcting common mode noise in a touch sensor panel according to embodiments of the invention.
Figure 2B:
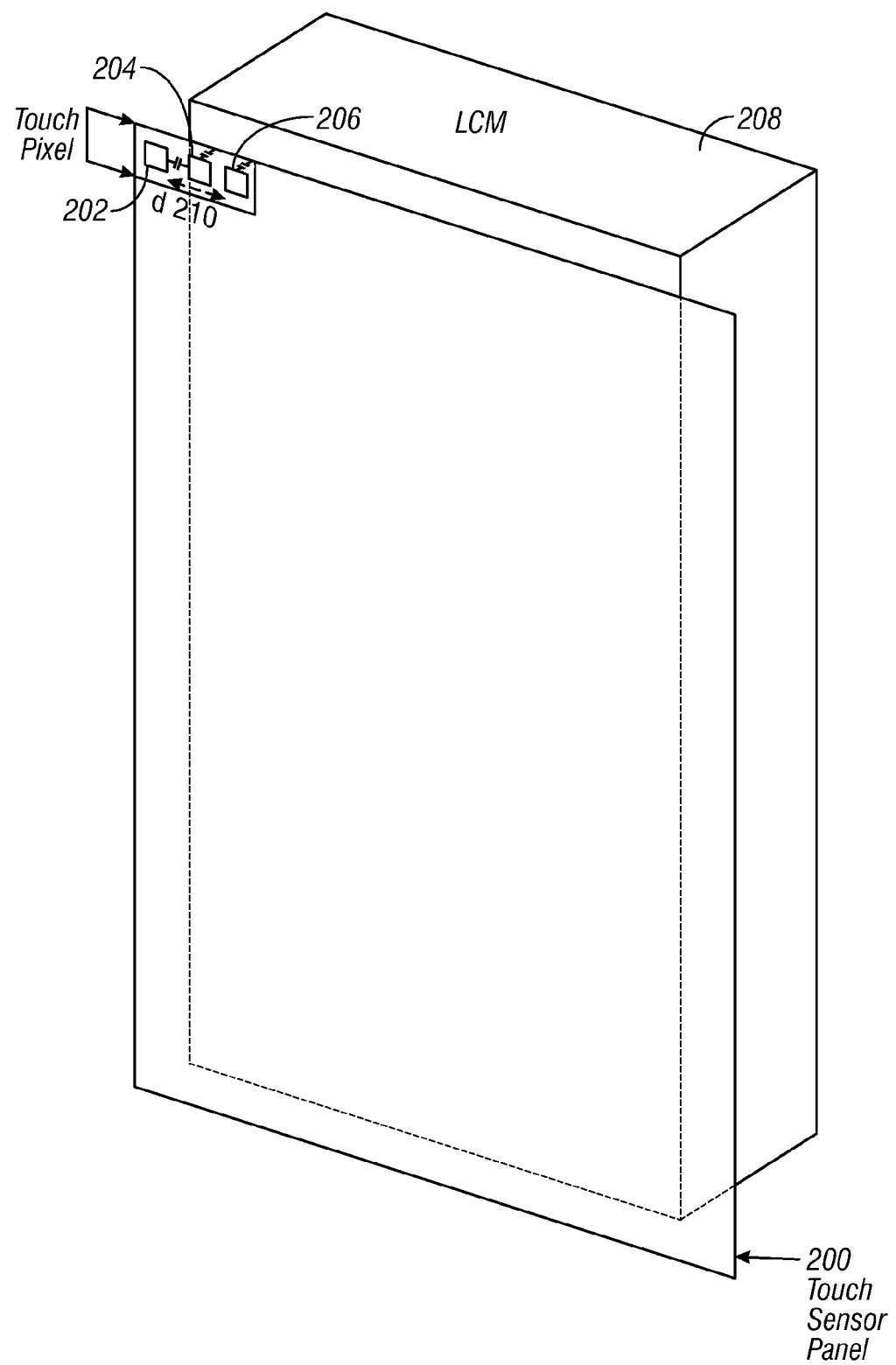
FIG. 2B is a perspective view illustrating the exemplary configuration for correcting common mode noise as shown in FIG. 2A according to embodiments of the invention.

FIG. 2A and FIG. 2B provide an exemplary configuration which may be used to implement this solution according to embodiments of the invention. For each sense element 204 of the touch sensor panel 200, a reference element 206 has been added to the touch sensor panel layout. In one embodiment, the reference element 206 is a conductive element that is the same size as the sense element 204, but is separated from the drive element 202 by a given distance, d 210. This distance d 210 ensures that the reference element 206 is located far enough from the corresponding drive element 202 such that the amount of capacitive coupling between the drive element 202 and the reference element 206 is negligible or at least of an order of magnitude smaller than the amount of capacitive coupling between the sense element 204 and the drive element 202. Thus, the reference element 206 serves to detect the same amount of common mode noise generated by the LCM 208 as would be detected by the sense element 204, but without being substantially affected by the drive element 202.

Figure 3:
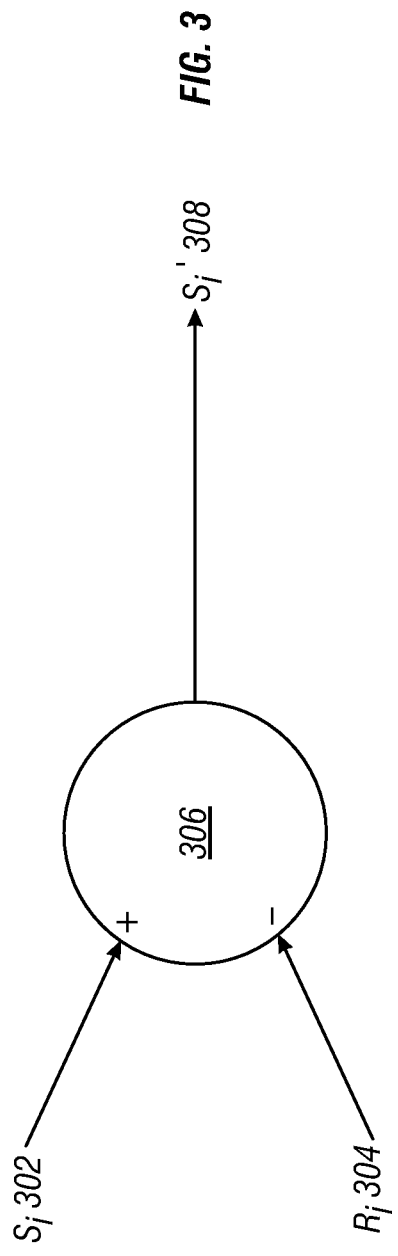
FIG. 3 illustrates a correction module adapted to correct a sense signal using an associated reference signal according to embodiments of the invention.

Noise that is common to both the sense element 204 and the reference element 206 can then be subtracted out in order to yield a corrected sense signal. This process is illustrated in FIG. 3. As the figure illustrates, a sense signal $S_i$ 302 and a corresponding reference signal $R_i$ 304 are fed to a correction module 306. The correction module 306 is adapted to generate a corrected signal $S_i'$ 308, where $S_i'$ 308=$S_i$ 302−$R_i$ 304.

Unfortunately, the extra reference elements 206, along with the separating distances d 210 do not easily lend themselves to small touch pixels with dimensional constraints (e.g., 5 mm by 5 mm). In order to utilize the reference elements 206 while still complying with required dimensional constraints of the touch pixels, the size of the sense elements 204 may be reduced. However, when the physical area of the conductive surface of the sense elements 204 is reduced, the amount of capacitive coupling decreases and signal detection becomes more difficult, thus decreasing the touch sensitivity of the touch sensor panel.

Some embodiments of the present invention therefore enable the utilization of reference elements without attendant sacrifices in touch sensitivity. In some embodiments, the touch sensor panel includes a smaller number of reference elements than sense elements. In some embodiments, the size of the reference elements is a fraction of the size of the sense elements. In still other embodiments, the size of the reference elements is a fraction of the size of the sense elements, and the touch sensor panel includes a smaller number of reference elements than sense elements.

In order to reduce the number of reference elements disposed within the touch sensor panel, it is recognized that common mode noise generated by the LCM is substantially uniform across the various regions of the touch sensor panel. Because of this uniformity, the touch sensor panel can include a smaller number of reference elements than sense elements. Additionally, the reference elements no longer require correspondence with a particular sense element, and can instead be commonly routed.

Figure 4:
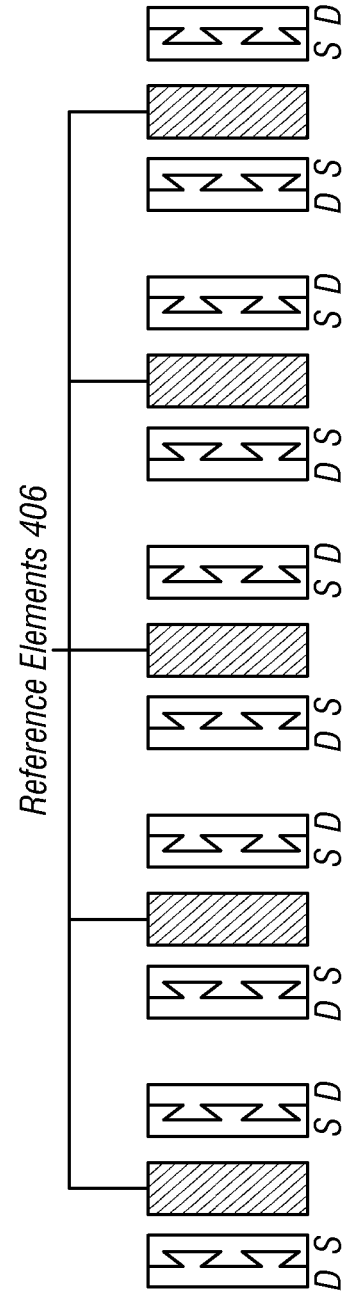
FIG. 4 illustrates an exemplary configuration for a portion of a touch sensor panel according to embodiments of the present invention.

FIG. 4 illustrates an exemplary configuration for a portion of a touch sensor panel according to embodiments of the present invention. Note that drive/sense combinations are indicated with a D S in the figure, while sense/drive combinations are indicated with an S D in the figure. As shown by the figure, a commonly routed set of reference elements 406 are in proximity to the sense elements, and each reference element separates each pair of successive sense elements. However, it should be understood that in touch sensor panel designs that do not have successive (i.e. otherwise adjacent) sense elements, the reference elements do not need to separate pairs of successive sense elements, but may instead be simply adjacent to or proximate to a sense element.

Each of the reference elements 406 is adapted to detect an amount of common mode noise generated by an LCM (not shown) or other electromagnetic noise-generating source. The detected values may then be aggregated and effectively averaged by logic adapted to scale the aggregated value to match that received by a sense column. Any combination of software, firmware, or hardware may be used for this purpose.

Figure 5:
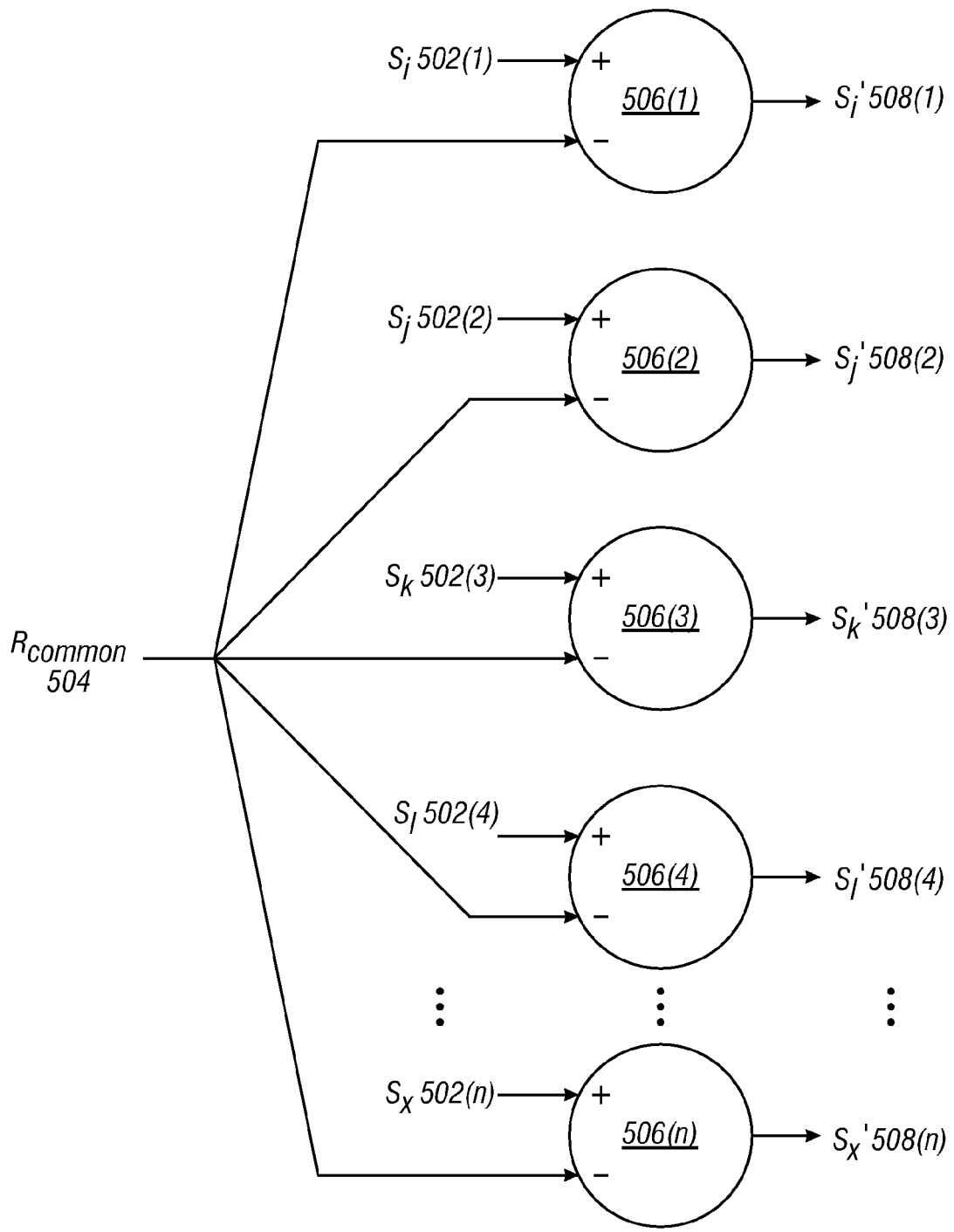
FIG. 5 illustrates an exemplary correction process adapted to generate a set of corrected signals by using a common reference signal according to embodiments of the present invention.

The resulting signal, $R_{common}$, may then be subtracted from each of the sense signals generated by the sense columns This process is shown in FIG. 5. As shown by the figure, each of the sense signals in the touch sensor panel $S_i$-$S_x$ is fed to a corresponding correction module 506(1)-506($n$) along with the resulting signal, $R_{common}$ 504. The correction modules 506(1)-506($n$) are adapted to generate a plurality of corrected signals, $S_x'$ 508(1)-$S_x'$ 508($n$) where for any signal $S_x$, $S_x'$ 508=$S_x$ 502−$R_x$ 504.

In order to further optimize space on the touch sensor panel, some embodiments of the present invention utilize reference elements which are a fraction of the size of the sense elements. Reference signals reduced in this manner can be subsequently scaled by correction logic. For example, in one embodiment, the reference elements each have a conductive area that results in a received noise level ⅓ as large as that of the sense elements. Each of the reference signals would then be amplified by 3 before being transmitted to the correction module.

Figure 6:
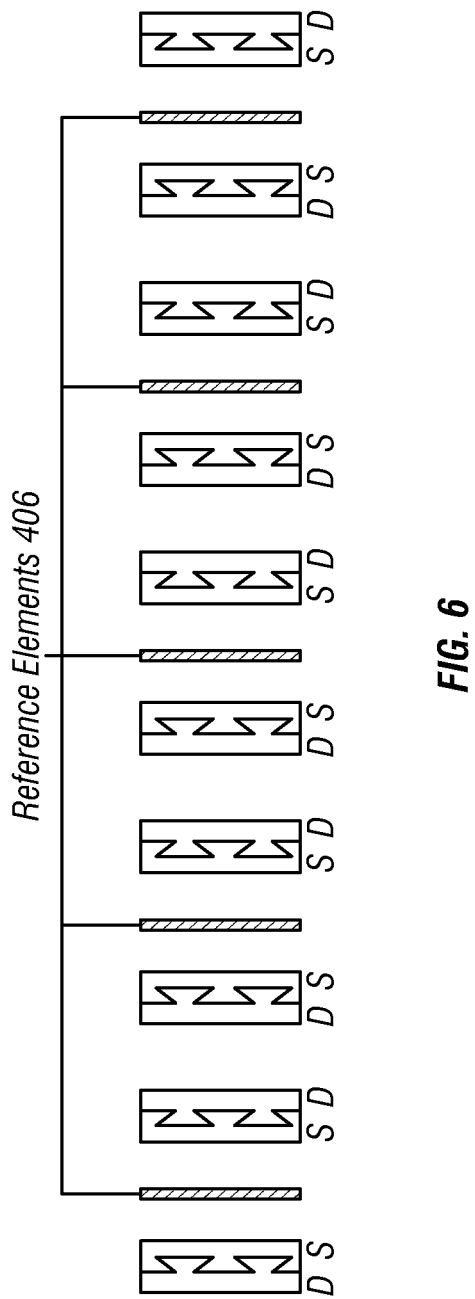
FIG. 6 illustrates an exemplary configuration for a touch sensor panel having reference elements with a combined size equal to that of a sense element according to embodiments of the present invention.

In a further embodiment, the combined size of the reference elements can be made equal to the size of a single sense element. This is shown by the reference elements 606 depicted in FIG. 6. Thus, $R_{common}$ may be the aggregate of the reference signals 606, and therefore no logic is needed for scaling an aggregated signal.

Figure 7A:
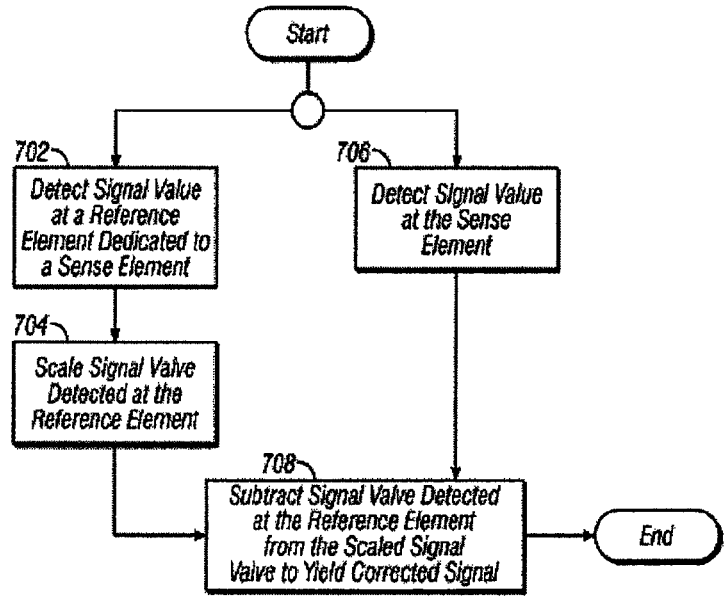
FIG. 7A depicts an exemplary method of correcting signals for use with a touch panel configuration where each reference element is dedicated to a particular sense element according to embodiments of the present invention.
Figure 7B:
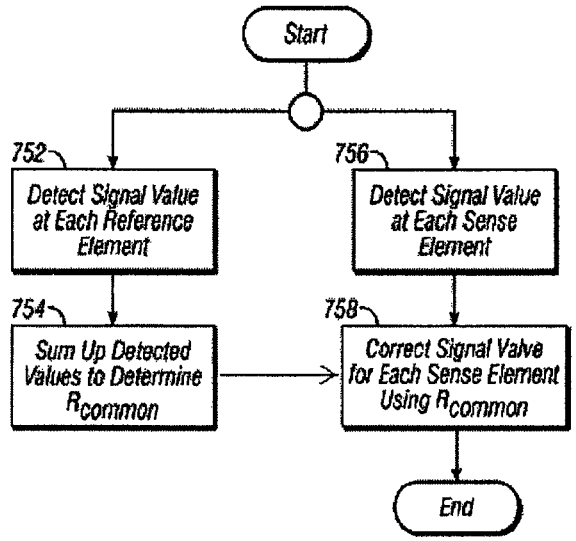
FIG. 7B depicts an exemplary method of correcting signals using a common reference signal according to embodiments of the present invention.

FIGS. 7A and 7B illustrate exemplary methods of correcting signals according to embodiments of the present invention. Note that the methods depicted by FIGS. 7A and 7B may be implemented by processing either analog or digital signals, or some combination of both, and may utilize any combination of hardware, firmware, or software.

FIG. 7A depicts an exemplary method of correcting signals for use with a touch panel configuration where each reference element is dedicated to a particular sense element according to embodiments of the present invention. At block 702, a signal value is detected at a reference element. Optionally, the signal value may be scaled by in order to compensate for differences between the size of the sense element relative to the size of the reference element. This is shown at block 704.

At block 706, the signal value is detected by the sense element. The corrected signal for the sense element may then be determined by subtracting the signal value detected from the reference element from the signal value detected by the sense element. This is shown at block 708.

Note that while the process depicted by FIG. 7A is described in terms of a reference element that is dedicated to a single sense element, in other embodiments, the signal value detected by a single reference element may be subtracted from the values detected by separate sense elements. In this manner, a single reference element may service multiple sense elements (for example, sense elements located on opposite sides of the reference element).

FIG. 7B depicts an exemplary method of correcting signals using a common reference signal according to embodiments of the present invention. As shown by the figure, signal values are detected at each reference element at block 752. The signal values are then summed up to determine a common reference signal $R_{common}$ at block 754.

Signal values are also detected at each sense element at block 756. After each signal value has been detected, it is corrected using $R_{common}$ at block 758. In one embodiment, the corrected value is given by subtracting the value of $R_{common}$ from the each of the detected signal values.

Note also that in some embodiments, each reference element may be adjacent or proximate to one or more dummy ground conductors. These dummy ground conductors are conductive elements adapted to screen the reference element from the effects of nearby stimulated drive elements (for example, during normal operation of the touch sensor panel). In some embodiments, the dummy ground conductors serve to reduce the distance d 210 separating the reference element from the nearby drive element.

Figure 8:
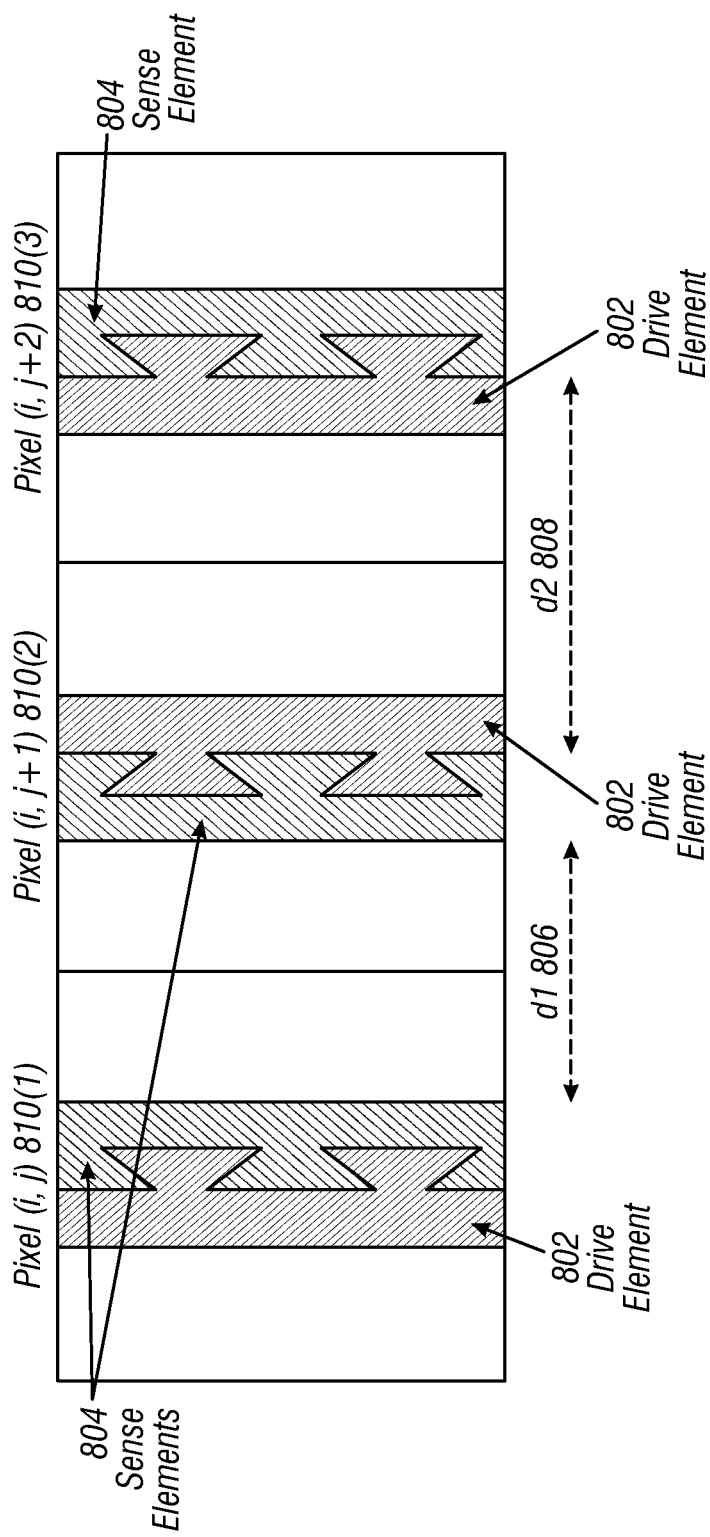
FIG. 8 illustrates a portion of a touch sensor panel including a set of pixels serviced by non-uniformly spaced sense elements.

FIG. 8 illustrates a portion of a touch sensor panel including a set of pixels formed from non-uniformly spaced sense elements. The figure illustrates a touch sensor panel including adjacent pixels (i, j) 810(1) (drive/sense), (i, j+1) 810(2) (sense/drive), and (i, j+2) 810(3) (drive/sense). As shown by the figure, the distance between successive sense elements 804 between pixels (i, j) 810(1) and (i, j+1) 810(2) is smaller than the distance between successive pixels (i, j+1) 810(2) and (i, j+2) 810(3). In some touch sensor panels, the spacing between sense elements may be further affected by one or more segments of routing which run across a portion of the touch sensor panel.

As stated above, some touch sensor panels include such non-uniformly spaced sense elements. This non-uniform spacing can introduce errors in touch detection algorithms which calculate a centroid based upon signals reported by the sense elements. These errors can result in misaligned, malformed, or shifted centroids. In some cases, the non-uniform spacing between successive sense elements also allows for unresponsive regions (i.e. "dead zones") to appear in the touch sensor panel.

Some embodiments of the present invention are therefore adapted to reduce the amount of error introduced by non-uniform spacing, as well as the number of dead zones appearing in the touch sensor panel. This may be accomplished, for example, by fabricating the touch sensor panel layout such that the centers of touch sensitivity of the drive-sense elements are more evenly spaced. In some embodiments, one or more dummy ground conductors separate adjacent sense elements. In one embodiment, the dummy ground conductors are adapted to prevent signal interference between pixels.

Figure 9:
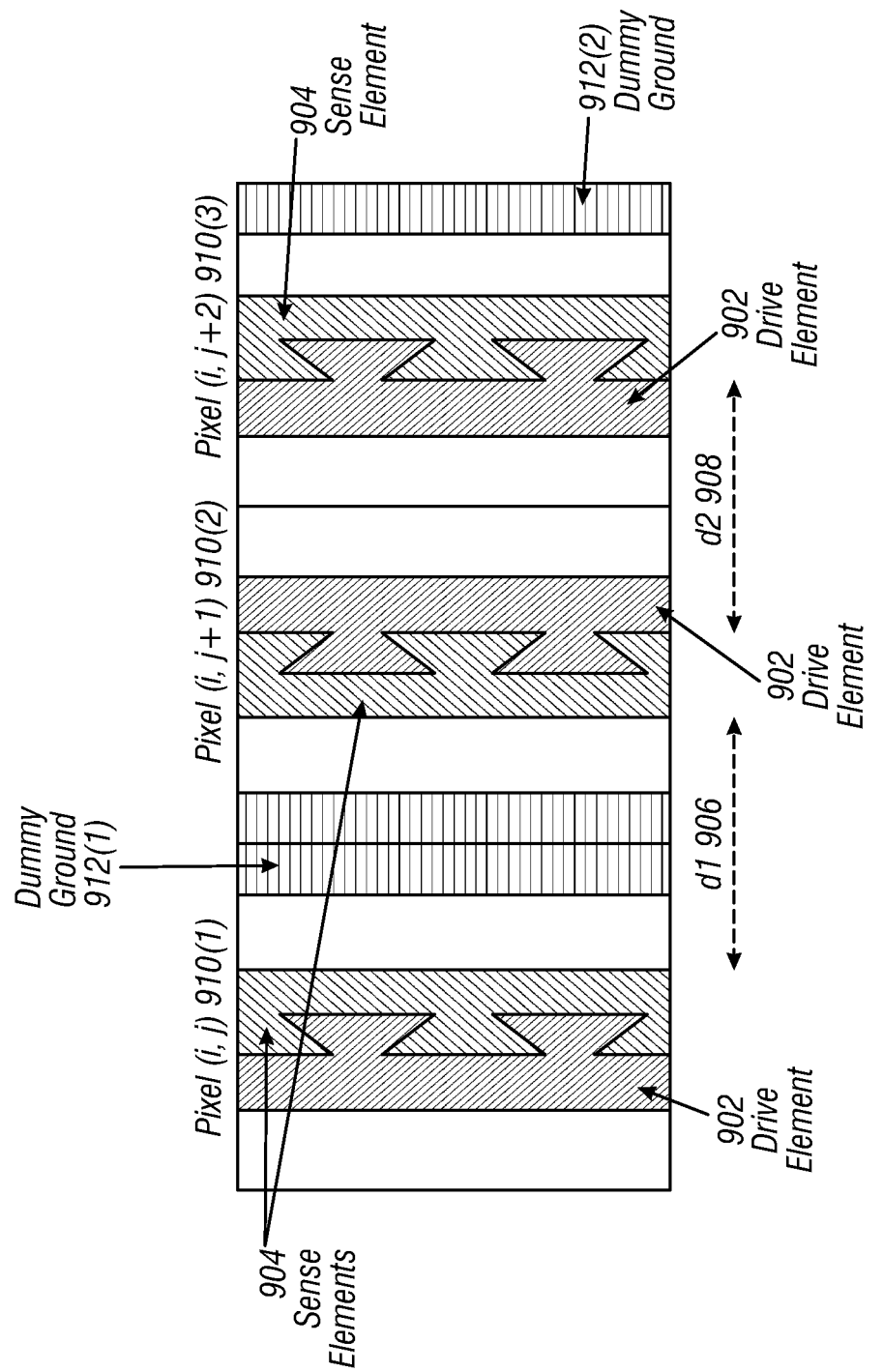
FIG. 9 illustrates a portion of an exemplary touch sensor panel with equally spaced sense elements separated by dummy ground conductors according to embodiments of the present invention.

FIG. 9 illustrates a portion of an exemplary touch sensor panel with equally spaced sense elements separated by dummy ground conductors according to embodiments of the present invention. As shown by the figure, a dummy ground conductor 912 has been inserted between each pair of otherwise adjacent sense columns (e.g., between pixels (i, j) 910(1) (drive/sense) and pixels (i, j+1) 910(1) (sense/drive), and between pixels (i, j+2) 910(3) and the subsequent pixel (not shown)). In one embodiment, the dummy ground conductors 912 are not touch sensitive and serve only to space the sense elements 904 evenly across the touch panel. Note that in the embodiment shown by FIG. 9, the distances between successive sense elements 904 d1 906 and d1 906 are equal across each successive pixel of the touch panel. In other embodiments, however, the distance d1 906 separating sense columns between drive/sense and sense/drive pixels (e.g., pixel (i, j) 910(1) and pixel (i, j+1) 910(2)) is not identical to the distance d2 908 separating sense columns between sense/drive and drive/sense pixels (e.g., pixel (i, j+1) 910(2) and pixel (i, j+2) 910(3)), but is close to being equal.

In touch sensor panels having touch pixels with fixed dimensional constraints (e.g., 5 mm×5 mm), the size of the drive elements 902 and/or the sense elements 904 may be reduced in order to attain the desired spacing between successive sense elements. Thus, a tradeoff exists between the physical area of the sense elements and the spacing between these elements.

However, even though the physical area of the conductive surface of the sense element may be reduced (often yielding weaker signals and therefore decreased touch sensitivity), the performance loss is more than offset by performance gains associated with even spacing of sense elements. For example, the accuracy of centroid calculation in a touch sensor panel optimized for even spacing can increase by a factor of two relative to the same panel without the optimization.

It is also worth noting that evenly spacing the sense elements can be practiced without correcting for LCM noise as previously described above. Conversely, correcting for LCM noise can be practiced without evenly spacing the sense elements. In some embodiments, however, both techniques may be utilized in the same touch sensor panel.

Figure 10:
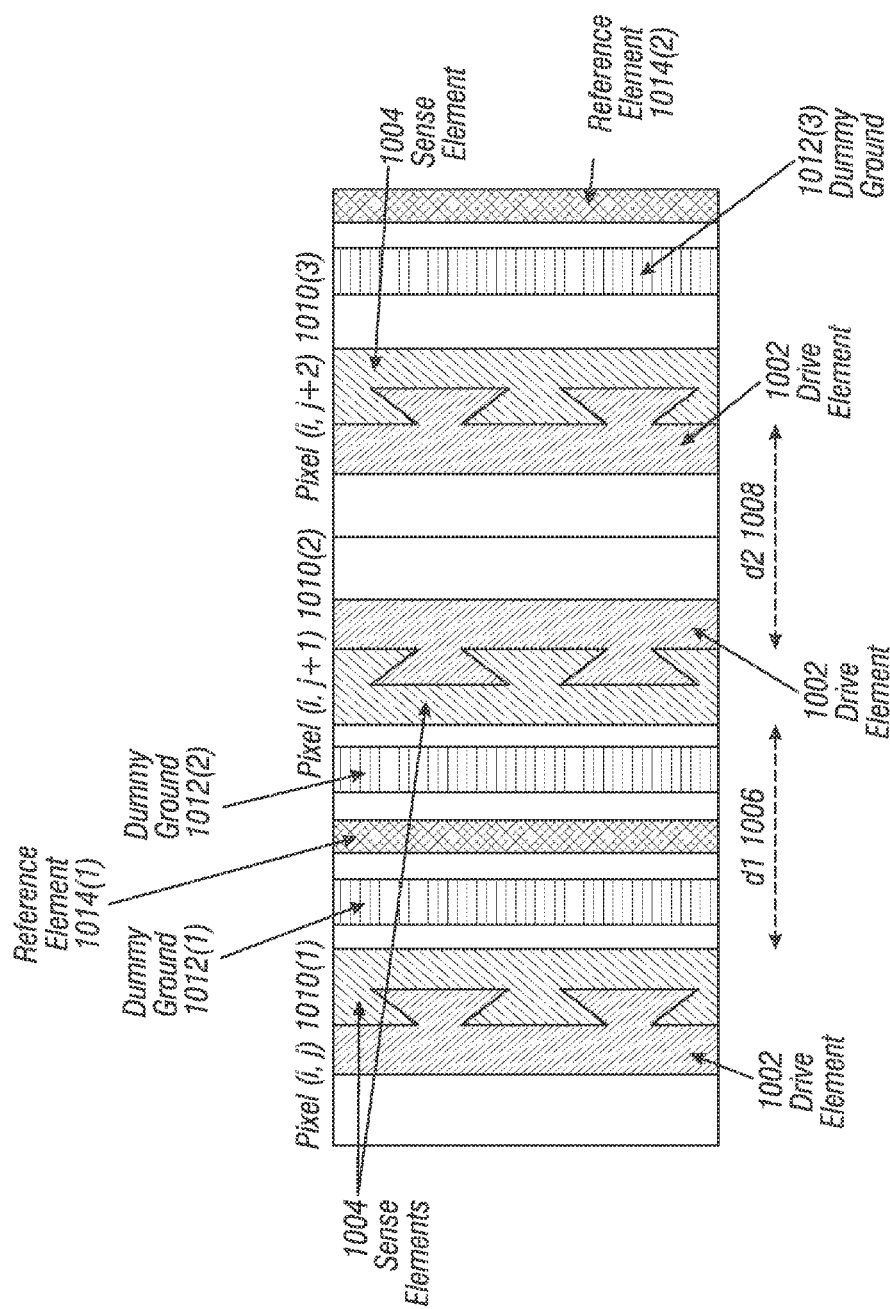
FIG. 10 illustrates a portion of an exemplary touch sensor panel adapted to correct LCM noise using reference elements that are situated between evenly spaced sense elements according to embodiments of the invention.

For example, FIG. 10 illustrates a portion of a touch sensor panel adapted to correct LCM noise using reference elements 1014 that are situated between evenly spaced sense elements 1004 according to embodiments of the invention. As shown by the figure, each reference element is 1014 is surrounded by a pair of dummy ground conductors 1012 (e.g., dummy ground conductors 1012(1) and 1012(2) surrounding reference element 1014(1)). Note that the size of the reference elements 1014, the size of the dummy ground conductors 1012, the size of the drive elements 1002, and the size of the sense elements 1004 may be adjusted in order to attain the desired separating distances d1 1006 and d2 1008 in a touch sensor panel having fixed pixel dimensions.

In some embodiments, additional dummy ground elements 1012 surround each reference element 1014(1). This may provide additional protection against signal interference from adjacent pixels. In other embodiments, the dummy ground conductors 1012(2) are not utilized. In some embodiments, the distance d1 1006 separating sense columns between drive/sense and sense/drive pixels (e.g., pixel (i, j) 1010(1) and pixel (i, j+1) 1010(2)) is not identical to the distance d2 1008 separating sense columns between sense/drive and drive/sense pixels (e.g., pixel (i, j+1) 1010(2) and pixel (i, j+2) 1010(3)), but is close to being equal.

Also, in some embodiments, the reference elements 1014(1) may be a fraction of the size of the sense elements 1004. In one embodiment, for example, the reference signal generated by the reference element 1014 is scaled based upon the relative difference between the sense element 1014 and the reference element 1012. In one embodiment, the combined size of each of the reference elements 1014 in the touch sensor panel is the same size as a single sense element 1014.

Figure 11:
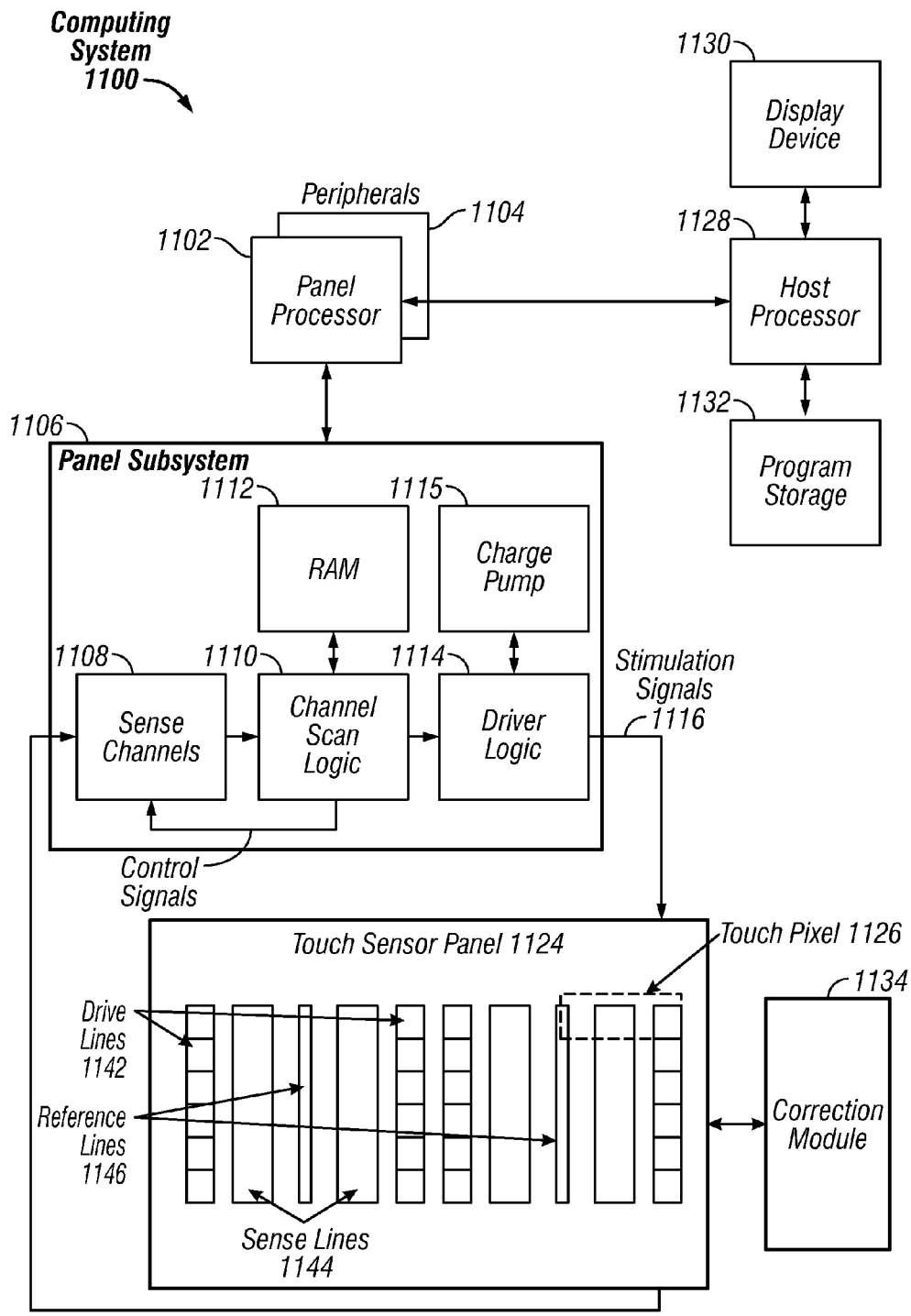
FIG. 11 illustrates an exemplary computing system including a touch sensor panel utilizing one or more reference lines and/or evenly spaced sense lines according to embodiments of the invention.

FIG. 11 illustrates exemplary computing system 1100 that can include one or more of the embodiments of the invention described above. Computing system 1100 can include one or more panel processors 1102 and peripherals 1104, and panel subsystem 1106. Peripherals 1104 can include, but are not limited to, random access memory (RAM) or other types of memory or storage, watchdog timers and the like. Panel subsystem 1106 can include, but is not limited to, one or more sense channels 1108, channel scan logic 1110 and driver logic 1114. Channel scan logic 1110 can access RAM 1112, autonomously read data from the sense channels and provide control for the sense channels. In addition, channel scan logic 1110 can control driver logic 1114 to generate stimulation signals 1116 at various frequencies and phases that can be selectively applied to drive lines of touch sensor panel 1124. In some embodiments, panel subsystem 1106, panel processor 1102 and peripherals 1104 can be integrated into a single application specific integrated circuit (ASIC).

Touch sensor panel 1124 can include a capacitive sensing medium having a plurality of drive lines 1142, a plurality of sense lines 1144, and a plurality of reference lines 1146. In one embodiment, the drive lines 1142, the sense lines 1144 and the reference lines 1146 are rectangular in shape, but various other geometries may be utilized according to embodiments of the present invention.

The touch sensor panel 1124 can be divided into a set of touch pixels 1126 in order to capture an "image" of a touch (e.g. a pattern of fingers touching the panel). Each sense line 1144 of touch sensor panel 1124 can drive sense channel 1108 (also referred to herein as an event detection and demodulation circuit) in panel subsystem 1106.

In some embodiments, each sense line 1144 is separated from the next sense line 1144 by a uniform distance. In one embodiment, the size of the drive lines 1142 and/or sense lines 1144 depends in part upon the desired spacing between successive sense lines 1144. In one embodiment, the size of the drive lines 1142 and/or sense lines 1144 depends in part upon desired pixel dimensions.

A correction module 1134 is adapted to correct for noise common to both the reference lines 1146 and the sense lines 1144. The correction module 1134 may include any combination of software, firmware, and/or hardware. Additionally, the correction module 1134 may be disposed within the touch sensor panel 1124 or within one or more other circuits.

Computing system 1100 can also include host processor 1128 for receiving outputs from panel processor 1102 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1128 can also perform additional functions that may not be related to panel processing, and can be coupled to program storage 1132 and display device 1130 such as an LCD display for providing a UI to a user of the device. Display device 1130 together with touch sensor panel 1124, when located partially or entirely under the touch sensor panel, can form touch screen 1118.

Note that one or more of the functions described above can be performed by firmware stored in memory (e.g. one of the peripherals 1104 in FIG. 11) and executed by panel processor 1102, or stored in program storage 1132 and executed by host processor 1128. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any storage medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 12A:
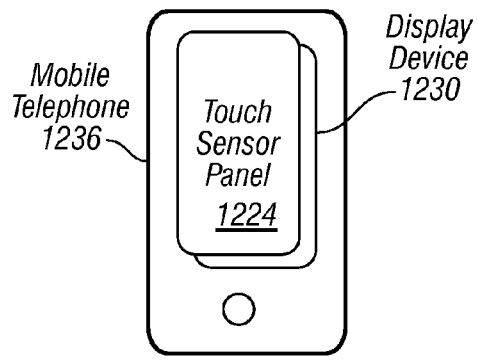
FIG. 12A illustrates an exemplary mobile telephone having a touch sensor panel utilizing one or more reference lines and/or evenly spaced sense lines according to embodiments of the invention.

FIG. 12A illustrates exemplary mobile telephone 1236 that can include touch sensor panel 1224 and display device 1230, the touch sensor panel including one or more reference lines 1146 and/or evenly spaced sense lines according to embodiments of the invention.

Figure 12B:
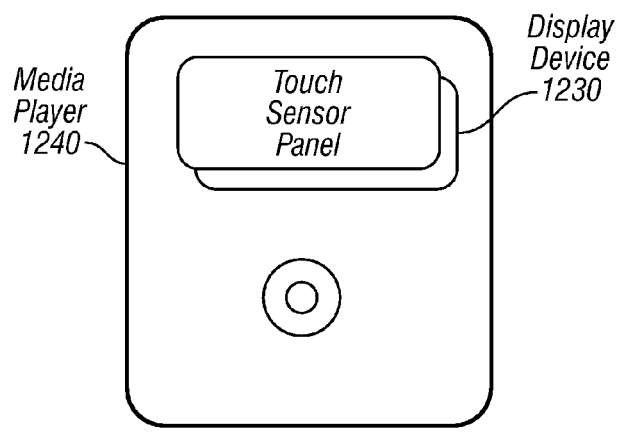
FIG. 12B illustrates an exemplary digital media player having a touch sensor panel utilizing one or more reference lines and/or evenly spaced sense lines according to embodiments of the invention.

FIG. 12B illustrates exemplary digital media player 1240 that can include touch sensor panel 1224 and display device 1230, the touch sensor panel including one or more reference lines 1146 and/or evenly spaced sense lines 1144 according to embodiments of the invention.

Figure 12C:
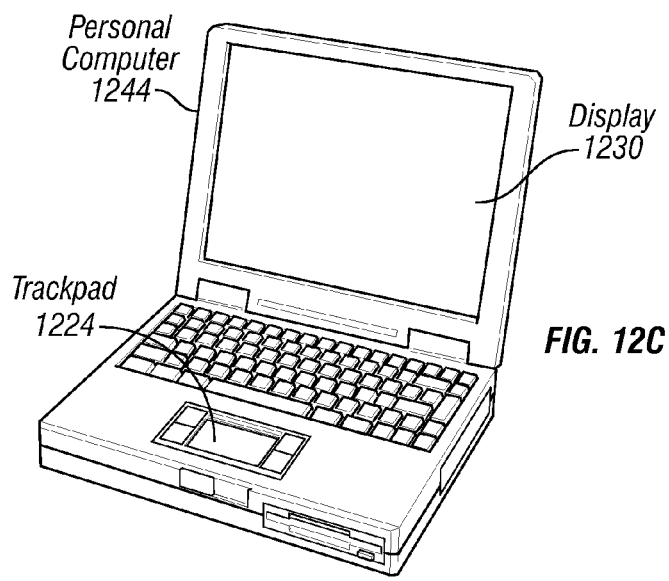
FIG. 12C illustrates an exemplary personal computer having a touch sensor panel (trackpad) and/or display that includes one or more reference lines and/or evenly spaced sense lines according to embodiments of the invention.

FIG. 12C illustrates exemplary personal computer 1244 that can include touch sensor panel (trackpad) 1224 and display 1230, the touch sensor panel and/or display of the personal computer (in embodiments where the display is part of a touch screen) including one or more reference lines 1146 and/or evenly spaced sense lines 1144 according to embodiments of the invention.

The mobile telephone, media player and personal computer of FIGS. 12A, 12B and 12C can achieve improved touch sensor panel performance by utilizing evenly spaced sense lines 1144 and/or one or more reference lines 1146 according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A touch sensor panel adapted to compensate for received electromagnetic noise, the touch sensor panel comprising:
   a plurality of drive elements;
   a plurality of sense elements disposed adjacent and corresponding to the plurality of drive elements and adapted to capacitively couple to the plurality of drive elements and detect touch events;
   a plurality of reference elements, each reference element being in proximity to at least one sense element, the reference elements adapted for capacitively coupling electromagnetic noise and providing reference output signals;
   a plurality of dummy ground conductors adapted to provide substantially uniform spacing between sense elements across the touch sensor panel, each reference element being positioned between two dummy ground conductors; and at least one correction module adapted to correct for noise in the detected touch events based at least in part upon the reference output signals.

2. The touch sensor panel of claim 1, wherein each reference element is dedicated to one or more sense elements.

3. The touch sensor panel of claim 2, wherein each reference element comprises an area that is a fraction of an area of the sense element.

4. The touch sensor panel of claim 1 further comprising at least one scaling module connected to at least one respective reference element, and wherein the at least one scaling module is adapted to scale an output from the respective reference element.

5. The touch sensor panel of claim 4, wherein at least some of the plurality of sense elements are arranged in sense columns having reference elements and the at least one scaling module is adapted to scale an output of the at least one sense column.

6. The touch sensor panel of claim 1, wherein each reference element is situated between adjacent sense elements.

7. The touch sensor panel of claim 1, wherein each reference element is commonly routed.

8. The touch sensor panel of claim 1, wherein each reference element comprises an area that is a fraction of an area of the sense element.

9. The touch sensor panel of claim 1 further comprising a set of scaling modules, wherein each scaling module of the set is connected to at least one respective reference element, and wherein each scaling module is adapted to scale an output from the respective reference element.

10. The touch sensor panel of claim 9, wherein at least some of the scaling modules are adapted to scale the output from the respective reference element based at least in part upon a size of a sense element relative to a size of a reference element.

11. The touch sensor panel of claim 1, wherein the touch sensor panel has the plurality of touch sensing elements disposed in either a plurality of rows or a plurality of columns wherein each of the plurality of rows or the plurality of columns of the touch sensing elements traverses the touch sensor panel for measuring touch along the ones of the plurality of rows or the plurality of columns.

12. The touch sensor panel of claim 1, wherein the electromagnetic noise comprises common mode noise generated by a liquid crystal display module.

13. The touch sensor panel of claim 1, wherein the drive elements and the sense elements together form drive-sense elements having centers of touch sensitivity that are evenly spaced.

14. A method of compensating for common mode noise in a touch sensor panel comprising a plurality of sense elements, the method comprising:
providing a plurality of drive elements;
providing a plurality of sense elements disposed adjacent and corresponding to the plurality of drive elements;
providing a plurality of reference elements in a touch sensor panel, the reference elements adapted for sensing the common mode noise;
providing a plurality of dummy ground conductors adapted to provide substantially uniform spacing between sense elements across the touch sensor panel, each reference element being positioned between two dummy ground conductors;
detecting a set of signals from the plurality of sense elements;
detecting a set of signals from the plurality of reference elements; and
correcting the set of signals from the plurality of sense elements based at least in part on the detected set of signals from the plurality of reference elements.

15. The method of claim 14, wherein the number of reference elements provided is smaller than the number of sense elements disposed within the touch sensor panel.

16. The method of claim 14, wherein correcting the set of signals from the plurality of sense elements based on the detected set of signals from the plurality of reference elements comprises reducing the value of the sensed touch signal by a correction value.

17. The method of claim 14, wherein each of the reference elements is positioned such that the amount of capacitive coupling between a reference element and an associated drive element is smaller than the amount of capacitive coupling between an associated sense element and the associated drive element.

18. The method of claim 14, wherein at least some of the plurality of sense elements are arranged in sense columns having reference elements and the at least one scaling module is adapted to scale an output of the at least one sense column.

19. The method of claim 18, wherein the plurality of sense elements are disposed in either a plurality of rows or a plurality of columns wherein each of the plurality of rows or the plurality of columns of the sense elements traverses the touch sensor panel for measuring touch along the ones of the plurality of rows or the plurality of columns.

20. The method of claim 14, wherein the drive elements and the sense elements together form drive-sense elements having centers of touch sensitivity that are evenly spaced using one or more dummy ground conductors between adjacent sense elements.

21. An electronic device including a touch sensor panel adapted to compensate for received electromagnetic noise, the touch sensor panel comprising:
a plurality of drive elements;
a plurality of sense elements in proximity to one or more of the plurality of drive elements and adapted to capacitively couple to one or more of the drive elements and detect touch events;
a plurality of reference elements, each reference element being in proximity to at least one sense element, the reference elements adapted for capacitively coupling electromagnetic noise and providing reference output signals;
a plurality of dummy ground conductors adapted to provide substantially uniform spacing between sense elements across the touch sensor panel, each reference element being positioned between two dummy ground conductors; and
at least one correction module adapted to correct for noise in the detected touch events based at least in part upon the reference output signals.

22. The electronic device of claim 21, wherein the touch sensor panel is incorporated into a mobile telephone or a digital media player.

23. A personal computer comprising:
a panel subsystem comprising:
sense channels;
driver logic; and
a touch sensor panel;
wherein the touch sensor panel comprises:
a plurality of drive elements;
a plurality of sense elements in proximity to one or more of the plurality of drive elements and adapted to capacitively couple to one or more of the drive elements and detect touch events;

a plurality of reference elements, each reference element being in proximity to at least one sense element, the reference elements adapted for capacitively coupling electromagnetic noise and providing reference output signals;

a plurality of dummy ground conductors adapted to provide substantially uniform spacing between sense elements across the touch sensor panel, each reference element being positioned between two dummy ground conductors; and at least one correction module adapted to correct for noise in the detected touch events based at least in part upon the reference output signals; and the sense channels adapted to receive outputs from the plurality of sense elements and the driver logic adapted to provide drive signals to the plurality of drive elements.

* * * * *